(12) United States Patent
Houst et al.

(10) Patent No.: US 9,989,068 B2
(45) Date of Patent: Jun. 5, 2018

(54) METHOD FOR CONTROLLING A TRIM-ADJUSTMENT MECHANISM FOR A CENTRIFUGAL COMPRESSOR

(71) Applicant: Honeywell International Inc., Morris Plains, NJ (US)

(72) Inventors: Vit Houst, Sestajovice (CZ); William Joseph Smith, Gardena, CA (US)

(73) Assignee: Honeywell International Inc., Morris Plains, NJ (US)

( * ) Notice: Subject to any disclaimer, the term of this patent is extended or adjusted under 35 U.S.C. 154(b) by 362 days.

(21) Appl. No.: 14/955,099

(22) Filed: Dec. 1, 2015

(65) Prior Publication Data
US 2017/0152862 A1 Jun. 1, 2017

(51) Int. Cl.
| | | |
|---|---|---|
| *F04D 29/46* | (2006.01) | |
| *F02B 37/18* | (2006.01) | |
| *F01D 17/16* | (2006.01) | |
| *F04D 25/04* | (2006.01) | |
| *F04D 29/28* | (2006.01) | |
| *F04D 29/42* | (2006.01) | |
| *F04D 27/02* | (2006.01) | |

(52) U.S. Cl.
CPC ......... *F04D 29/464* (2013.01); *F01D 17/165* (2013.01); *F02B 37/183* (2013.01); *F04D 25/045* (2013.01); *F04D 27/0253* (2013.01); *F04D 29/284* (2013.01); *F04D 29/4206* (2013.01); *F05D 2220/40* (2013.01)

(58) Field of Classification Search
CPC ............... F04D 29/464; F04D 27/0253; F04D 29/4206; F04D 25/045; F04D 29/284; F02B 37/183; F01D 17/165; F05D 2220/40

USPC .......................................... 415/150, 159–163
See application file for complete search history.

(56) References Cited

U.S. PATENT DOCUMENTS

| 2008/0193288 A1* | 8/2008 | Anschel ................ F04D 29/444 |
| | | 415/208.2 |
| 2010/0140960 A1* | 6/2010 | Dolton .................. F02B 37/225 |
| | | 290/1 R |

(Continued)

FOREIGN PATENT DOCUMENTS

| DE | 102008028298 A1 | 12/2009 |
| DE | 102010026176 A1 | 1/2012 |

(Continued)

OTHER PUBLICATIONS

Search Report and Opinion for European patent application 16196440.8, dated Apr. 19, 2017.

*Primary Examiner* — Hoang Nguyen
(74) *Attorney, Agent, or Firm* — John C. James

(57) ABSTRACT

A method for controlling an inlet-adjustment mechanism in an air inlet for a compressor so as to switch the mechanism in a binary fashion between two positions P1 and P2 for adjusting a flow area of the inlet. The method includes identifying a threshold line on a compressor map of pressure ratio versus corrected flow rate for the compressor. The threshold line is a line on which the pressure ratio and flow rate of the compressor are the same for the P1 and P2 positions of the inlet-adjustment mechanism at equal speeds. When the operating point of the compressor on the compressor map crosses the threshold line, the inlet-adjustment mechanism is switched from one of its binary positions to the other.

6 Claims, 8 Drawing Sheets

(56) References Cited

U.S. PATENT DOCUMENTS

| | | | | |
|---|---|---|---|---|
| 2010/0263391 | A1* | 10/2010 | Tetu | F04D 27/0253 |
| | | | | 62/89 |
| 2015/0198163 | A1* | 7/2015 | Lei | F04D 17/105 |
| | | | | 415/207 |
| 2016/0047324 | A1* | 2/2016 | Kemmerling | F02B 39/00 |
| | | | | 60/611 |
| 2016/0195109 | A1* | 7/2016 | Richards | F04D 29/266 |
| | | | | 60/602 |

FOREIGN PATENT DOCUMENTS

| | | |
|---|---|---|
| DE | 102011121996 B4 | 6/2013 |
| DE | 102012011423 B3 | 11/2013 |
| GB | 957884 A | 5/1964 |
| JP | 3719337 B2 | 9/2005 |
| WO | 2013074503 A1 | 5/2013 |

* cited by examiner

METHOD FOR CONTROLLING A TRIM-ADJUSTMENT MECHANISM FOR A CENTRIFUGAL COMPRESSOR

BACKGROUND OF THE INVENTION

The present disclosure relates to centrifugal compressors, such as used in turbochargers, and more particularly relates to centrifugal compressors in which the effective inlet area or diameter can be adjusted for different operating points.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

Turbochargers typically employ a compressor wheel of the centrifugal (also known as "radial") type because centrifugal compressors can achieve relatively high pressure ratios in a compact arrangement. Intake air for the compressor is received in a generally axial direction at an inducer portion of the centrifugal compressor wheel and is discharged in a generally radial direction at an exducer portion of the wheel. The compressed air from the wheel is delivered to a volute, and from the volute the air is supplied to the intake of an internal combustion engine.

The operating range of the compressor is an important aspect of the overall performance of the turbocharger. The operating range is generally delimited by a surge line and a choke line on an operating map for the compressor. The compressor map is typically presented as pressure ratio (discharge pressure Pout divided by inlet pressure Pin) on the vertical axis, versus corrected mass flow rate on the horizontal axis. The choke line on the compressor map is located at high flow rates and represents the locus of maximum mass-flow-rate points over a range of pressure ratios; that is, for a given point on the choke line, it is not possible to increase the flow rate while maintaining the same pressure ratio because a choked-flow condition occurs in the compressor.

The surge line is located at low flow rates and represents the locus of minimum mass-flow-rate points without surge, over a range of pressure ratios; that is, for a given point on the surge line, reducing the flow rate without changing the pressure ratio, or increasing the pressure ratio without changing the flow rate, would lead to surge occurring. Surge is a flow instability that typically occurs when the compressor blade incidence angles become so large that substantial flow separation arises on the compressor blades. Pressure fluctuation and flow reversal can happen during surge.

In a turbocharger for an internal combustion engine, compressor surge may occur when the engine is operating at high load or torque and low engine speed, or when the engine is operating at a low speed and there is a high level of exhaust gas recirculation (EGR). Surge can also arise when an engine is suddenly decelerated from a high-speed condition. Expanding the surge-free operation range of a compressor to lower flow rates is a goal often sought in compressor design.

One scheme for shifting the surge line of a centrifugal compressor to the left (i.e., surge is delayed to a lower flow rate at a given pressure ratio) and for shifting the choke flow line to the right (i.e., choke flow increases to a higher flow rate at a given pressure ratio) is to employ a trim-adjustment mechanism in the compressor inlet. Applicant is the owner of co-pending applications disclosing various trim-adjustment mechanisms of this type, see, e.g., application Ser. Nos. 14/537,339; 14/532,278; 14/642,825; 14/573,603; and 14/551,218; the entire disclosures of said applications being hereby incorporated herein by reference.

The present disclosure relates to methods for controlling such a trim-adjustment mechanism.

BRIEF SUMMARY OF THE DISCLOSURE

The present disclosure describes a method for controlling an inlet-adjustment mechanism in an air inlet for a compressor so as to switch the mechanism in a binary fashion between two positions P1 and P2. The method includes identifying a threshold line on a compressor map of pressure ratio versus corrected flow rate for the compressor. The threshold line is a line on which the pressure ratio and flow rate of the compressor are the same for the P1 and P2 positions of the inlet-adjustment mechanism at equal speeds. In other words, the threshold line is a curve fit of points on the compressor map where a series of constant-speed lines achieved with the inlet-adjustment mechanism in the P1 position cross their respective constant-speed lines achieved with the inlet-adjustment mechanism in the P2 position. In accordance with the method, the inlet-adjustment mechanism is placed in one of the binary positions or the other based on a comparison of a location of the operating point relative to the threshold line.

In one embodiment, the method comprises:

providing a first compressor map describing performance of the compressor with the inlet-adjustment mechanism in the P1 position, the first compressor map being in the form of compressor pressure ratio PR versus corrected flow rate $W_c$, the first compressor map including at least two constant-speed lines $N1_{P1}$ and $N2_{P2}$ each representing PR versus $W_c$ with rotational speed of the compressor held constant;

providing a second compressor map describing performance of the compressor with the inlet-adjustment mechanism in the P2 position, the second compressor map being in the form of compressor pressure ratio PR versus corrected flow rate $W_c$, the second compressor map including at least two constant-speed lines $N1_{P2}$ and $N2_{P2}$ each representing PR versus $W_c$ with rotational speed of the compressor held constant, where the value of $N1_{P1}$ is equal to the value of $N1_{P2}$ and the value of $N2_{P1}$ is equal to the value of $N2_{P2}$;

identifying a threshold line comprising a curve fit of at least two points each represented by coordinates of PR versus $W_c$, at which the $N1_{P1}$ speed line crosses the $N1_{P2}$ speed line and the $N2_{P1}$ speed line crosses the $N2_{P2}$ speed line, such that for operating points falling on the threshold line, pressure ratio and corrected flow at equal speeds are the same with the inlet-adjustment mechanism in the P1 and P2 positions, wherein the threshold line divides the first compressor map into two regions R1 and R2 respectively located on opposite sides of the threshold line;

comparing, for a current operating point of the compressor during operation, pressure ratio PR and corrected flow $W_c$ to the threshold line and determining which of the two regions R1 and R2 the current operating point falls into; and placing the inlet-adjustment mechanism in the P1 position when the operating point falls into the region R1 and placing the inlet-adjustment mechanism in the P2 position when the operating point falls into the region R2.

In one embodiment described herein, the first compressor map includes at least a third speed line $N3_{P1}$ and the second compressor map includes at least a third speed line $N3_{P2}$ providing at least a third point represented by coordinates of PR versus $W_c$ at which the $N3_{P1}$ speed line crosses the $N3_{P2}$ speed line, the threshold line being a curve fit of at least three points. In some embodiments, there can be four, five, six, seven, or more such speed lines, such that the threshold line is a curve fit of four, five, six, seven, or more points.

The method can include storing the first compressor map in an engine control unit (ECU), detecting PR and $W_c$ of the compressor during operation, and inputting the detected PR and $W_c$ into the ECU, wherein the ECU is programmed to perform the comparing step periodically as the current operating point moves around on the first compressor map. The method further can include outputting a command from the ECU to an actuator for the inlet-adjustment mechanism for switching from one of the P1 and P2 positions to the other of the P1 and P2 positions upon the ECU detecting that the threshold line has been crossed.

In one embodiment the first and second compressor maps are based on test data for the compressor operated with the inlet-adjustment mechanism respectively in the P1 position and in the P2 position.

In another embodiment the first and second compressor maps are based on model-predicted data for the compressor with the inlet-adjustment mechanism respectively in the P1 position and in the P2 position.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
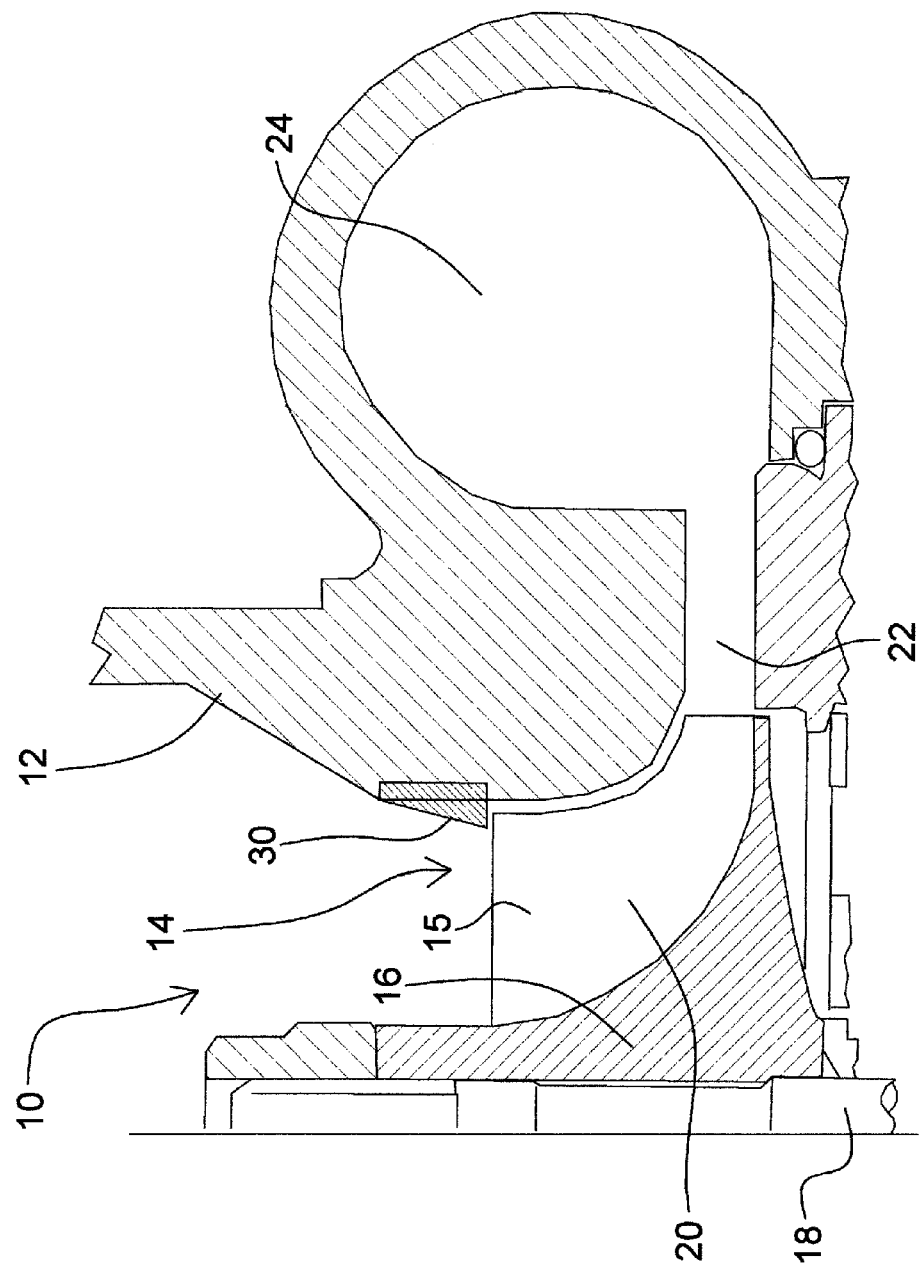
FIG. 1 is a diagrammatic depiction of a compressor having an inlet-adjustment mechanism, wherein the inlet-adjustment mechanism is in a first or P1 position.
Figure 2:
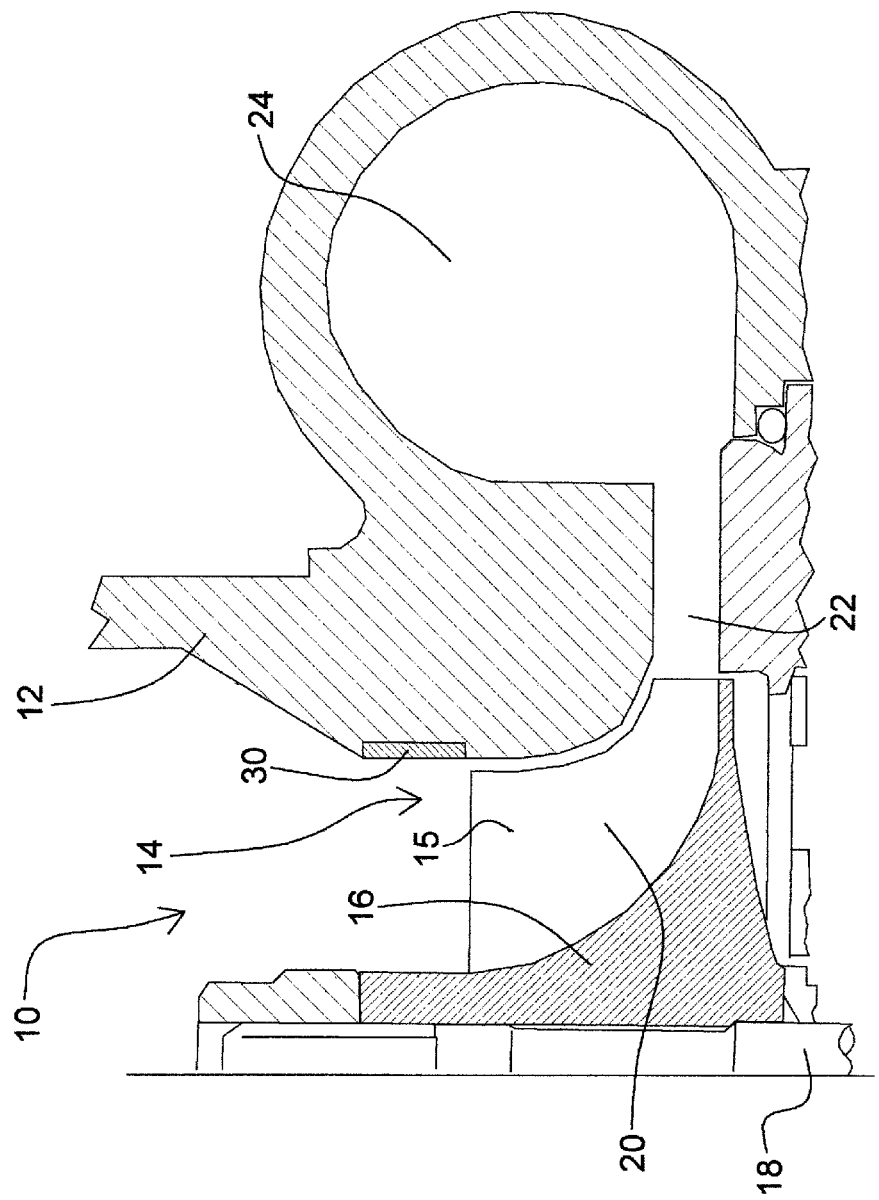
FIG. 2 is similar to FIG. 1 but shows the inlet-adjustment mechanism in a second or P2 position.
Figure 3:
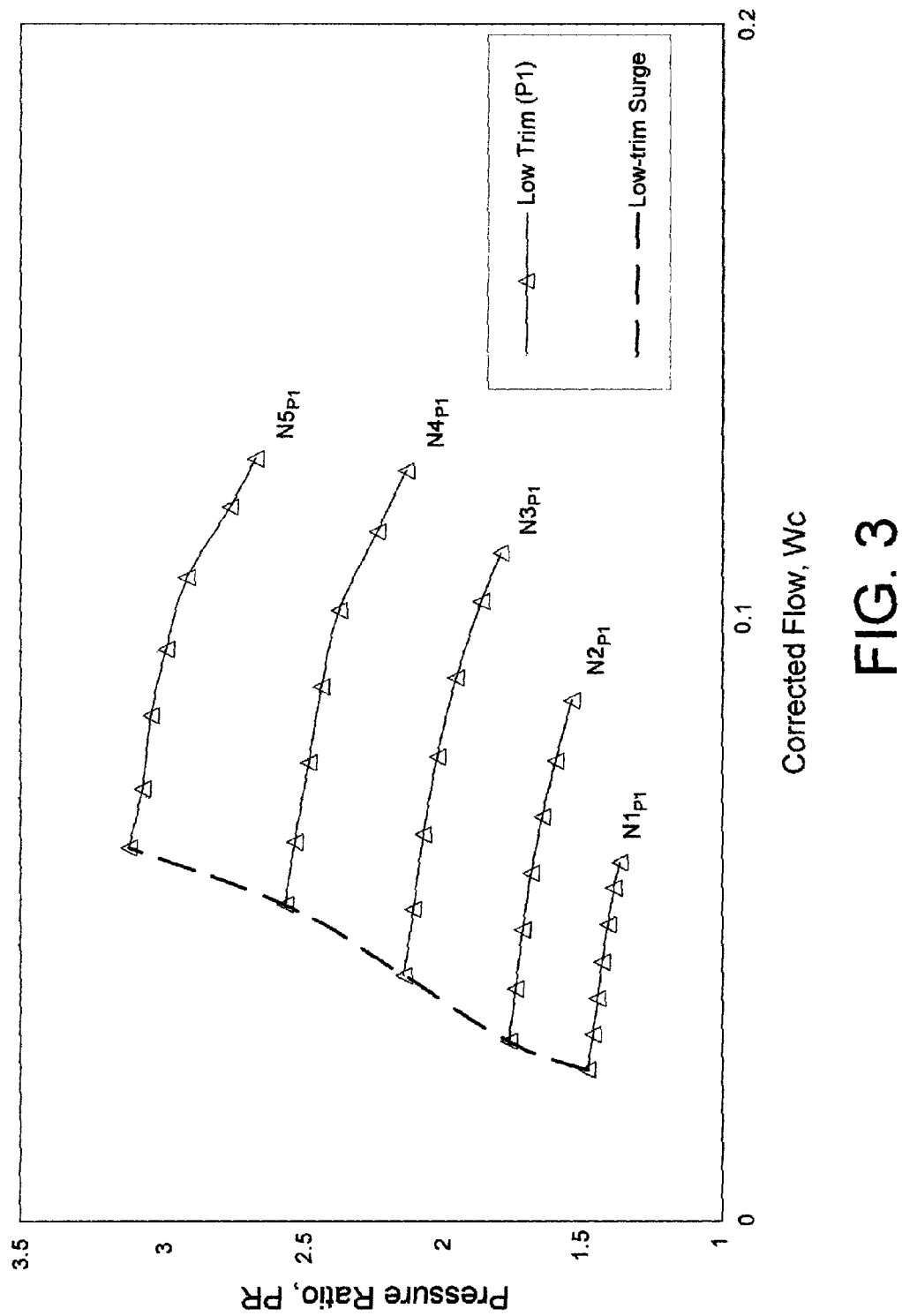
Figure 4:
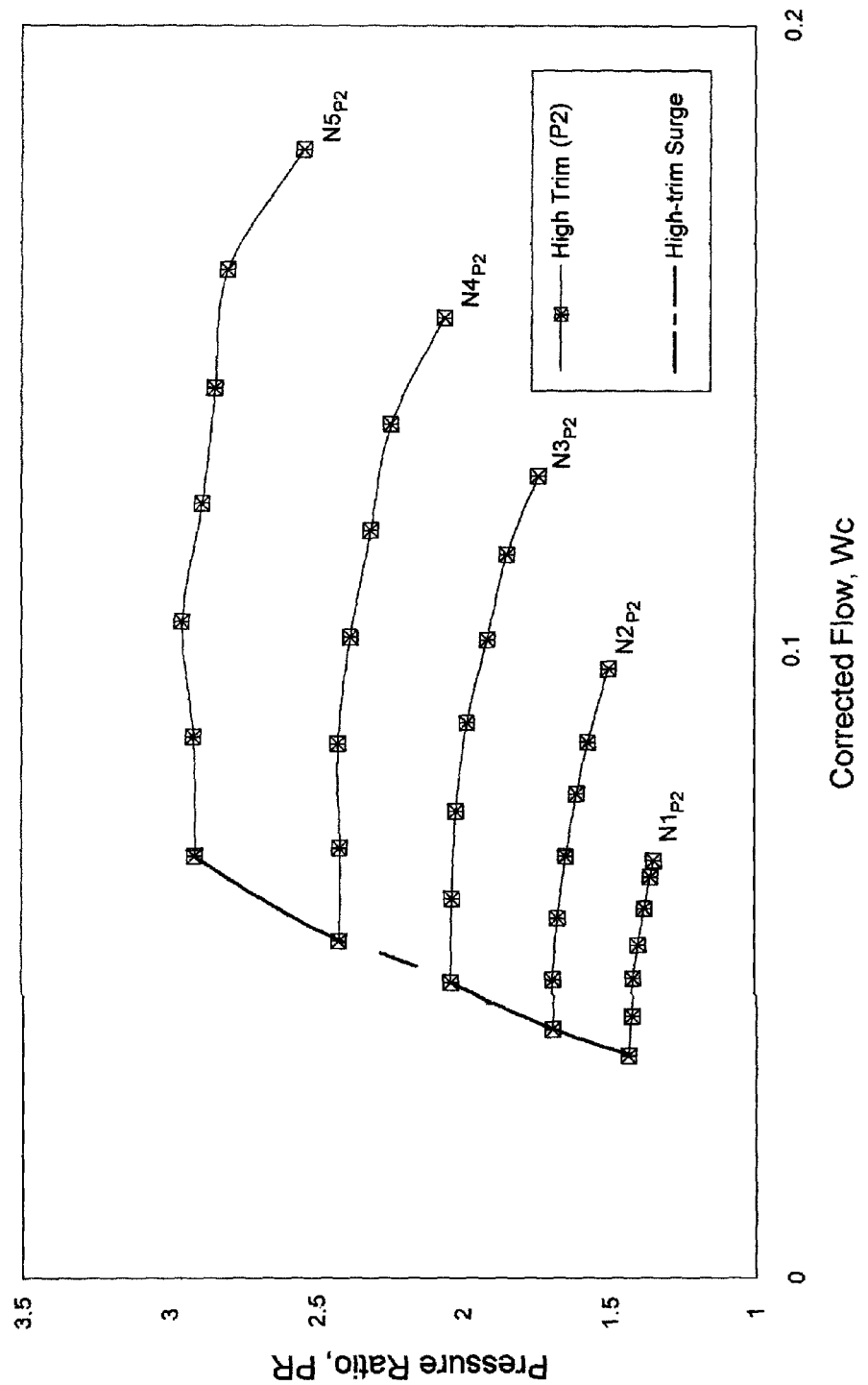
Figure 5:
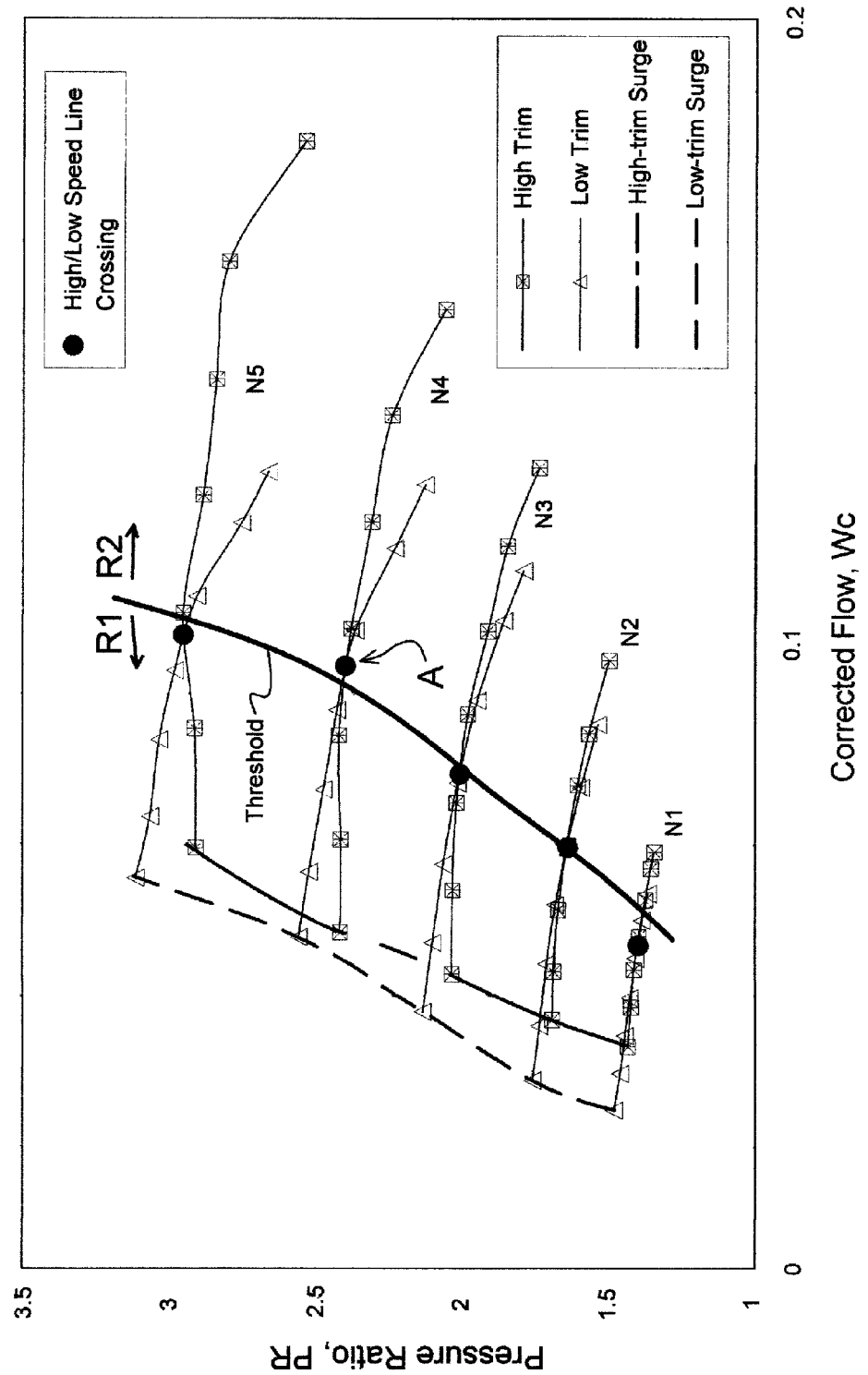
Figure 6:
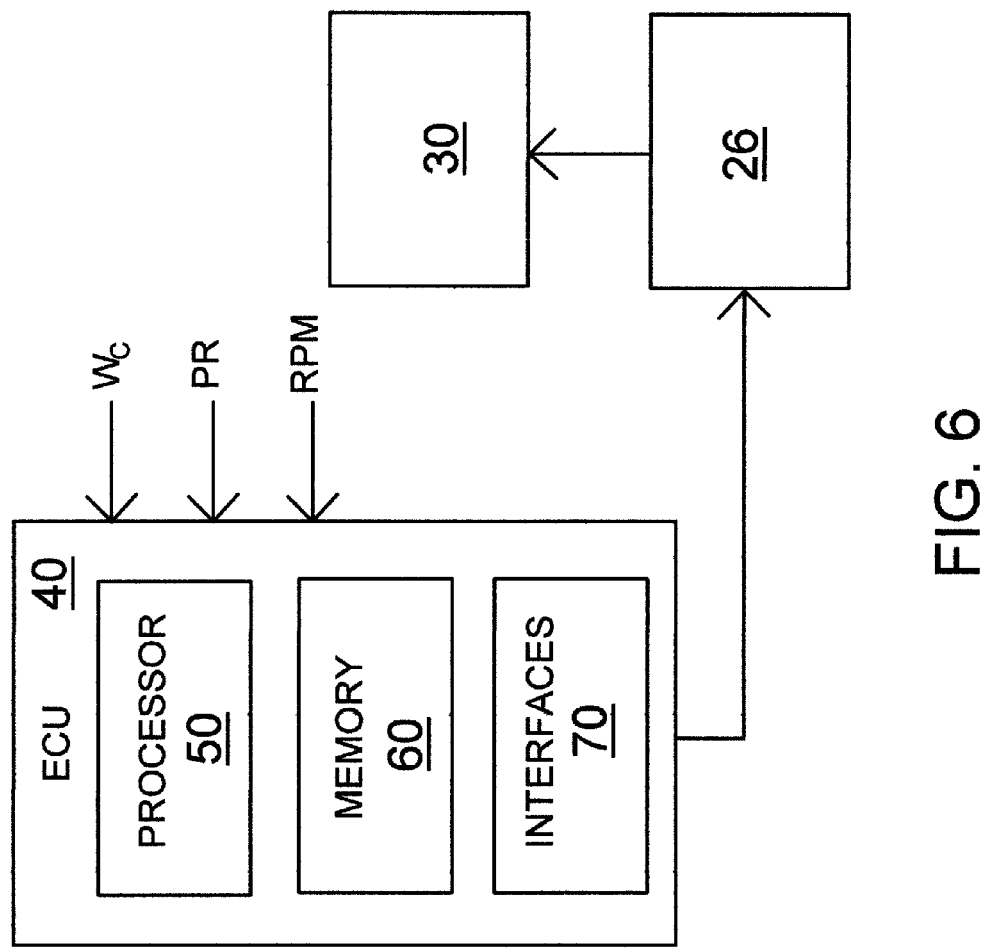
Figure 7:
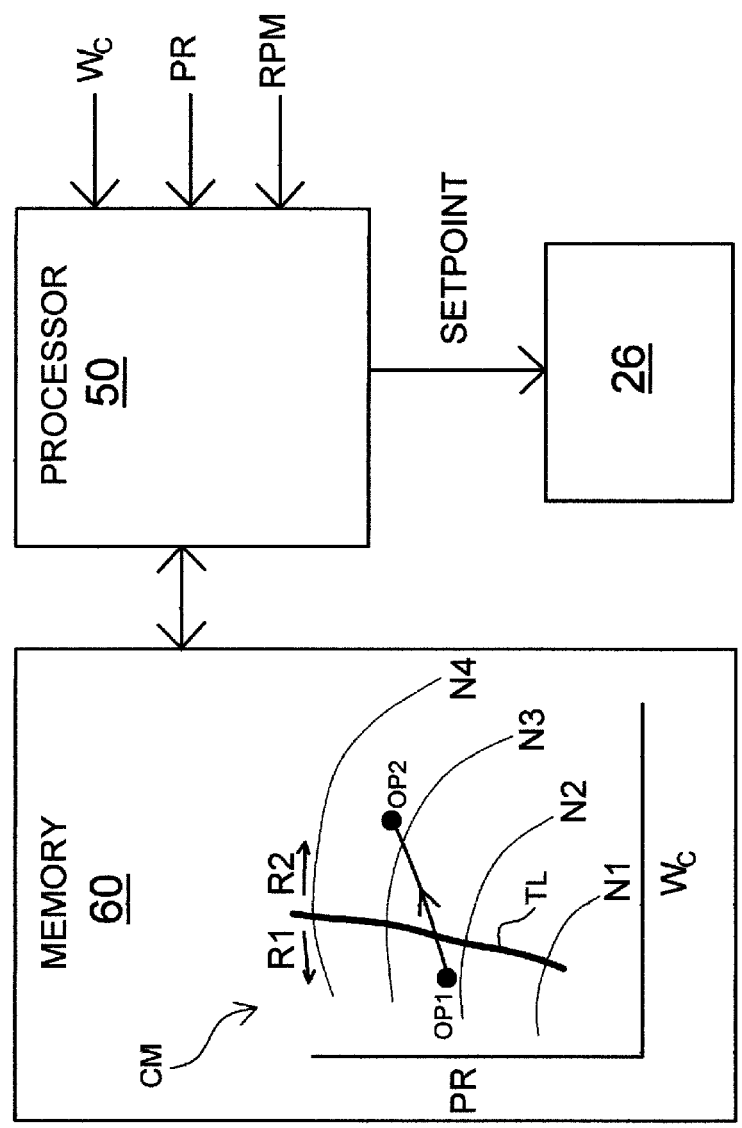
Figure 8:
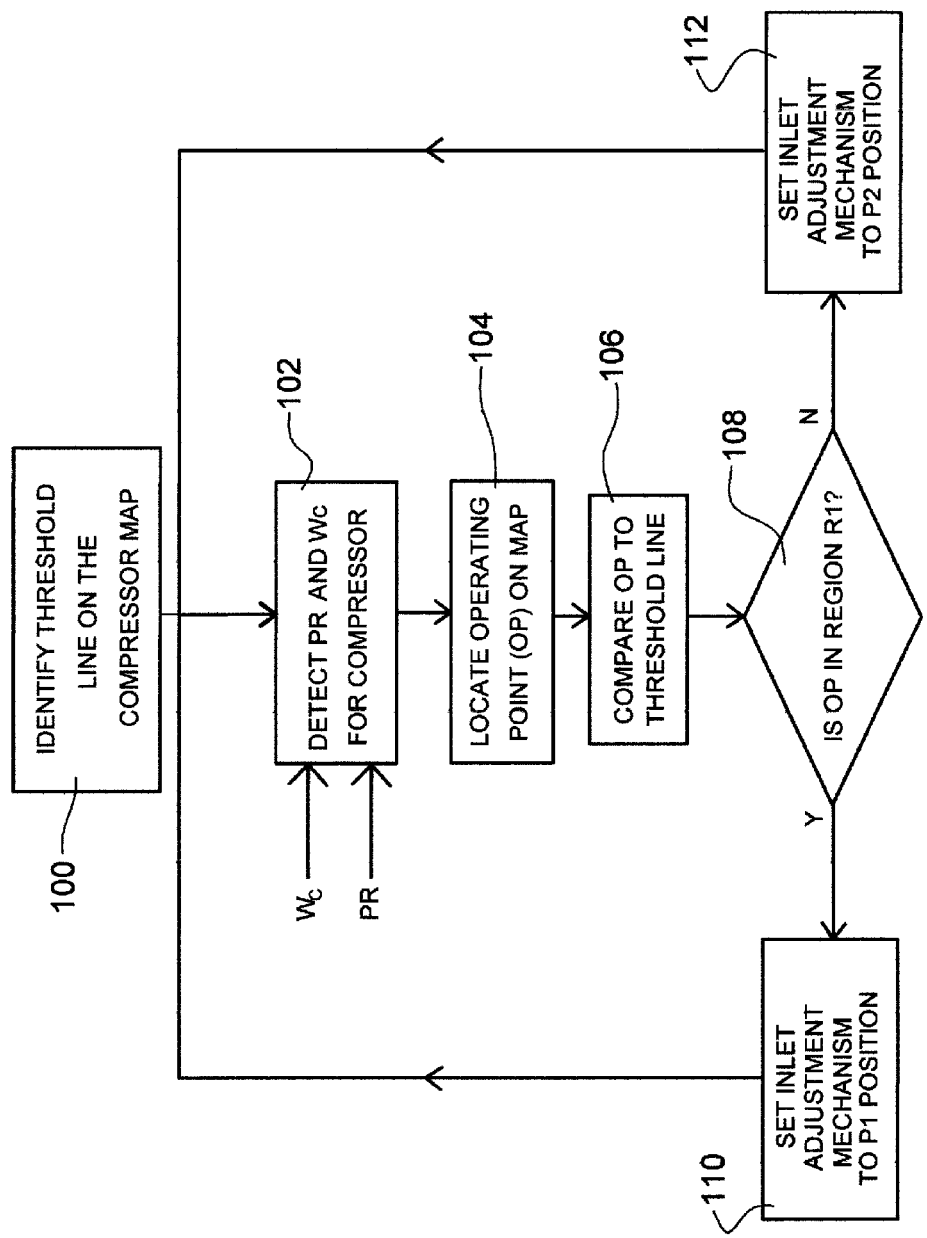

FIG. 3 schematically depicts a compressor map with the inlet-adjustment mechanism in the P1 position corresponding to FIG. 1;

FIG. 4 schematically depicts a compressor map with the inlet-adjustment mechanism in the P2 position corresponding to FIG. 2;

FIG. 5 depicts a superposition of a series of constant-speed lines from the map for the P1 position, and a series of constant-speed lines from the map for the P2 position, and also illustrates a threshold line representing a curve fit of points at which the respective speed lines for the P1 and P2 positions cross each other;

FIG. 6 is a diagrammatic illustration of an engine control unit (ECU) in communication with an actuator that actuates the inlet-adjustment mechanism to move between the P1 and P2 positions;

FIG. 7 is a diagrammatic illustration of the memory and processor of the ECU and their interaction based on inputs of corrected flow and compressor pressure ratio (and optionally turbocharger rotational speed) so as to generate a setpoint for the actuator; and FIG. 8 is a flow diagram illustrating a method in accordance with an embodiment of the invention.

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A compressor 10 in accordance with one embodiment of the invention is illustrated in cross-sectional view in FIGS. 1 and 2. The compressor 10 comprises a compressor housing 12 that defines an air inlet 14 extending along an axial direction of the compressor. A compressor wheel 15, comprising a hub 16 from which a plurality of blades 20 extend generally radially outwardly, is disposed in the compressor housing and is affixed to one end of a shaft 18 that is rotatably driven in a suitable manner (e.g., by an exhaust gas-driven turbine, not shown) for rotatably driving the compressor wheel 15. The compressor housing defines a diffuser 22 for receiving and diffusing air that is compressed as it passes through the compressor wheel. The diffuser delivers the diffused compressed air into a volute 24 defined by the compressor housing.

In accordance with the invention, the compressor of the turbocharger includes an inlet-adjustment mechanism 30 disposed in the air inlet 14 of the compressor housing and movable between an open or "low-trim" position (FIG. 1) and a closed or "high-trim" position (FIG. 2). The low-trim position is also referred to herein as the P1 position, and the high-trim position is referred to as the P2 position. The movement of the mechanism 30 can entail axial sliding, pivotal movement, or helicoidal (screw-type) movement of the mechanism, to name a few non-limiting examples. The details of the structure and operation of the inlet-adjustment mechanism 30 are not pertinent to the present disclosure, and any mechanism that operates to effectively alter the flow area of the air inlet 14 leading into the compressor wheel 15 can be employed in the practice of the present invention.

The inlet-adjustment mechanism 30 enables adjustment of the effective size or diameter of the inlet into the compressor wheel 15. As illustrated in FIG. 2, when the inlet-adjustment mechanism is in the high-trim or P2 position, the effective diameter of the inlet into the compressor wheel is relatively increased compared to the effective diameter in the low-trim or P1 position of FIG. 1. In order for this effect to be achieved, the axial spacing distance from the mechanism 30 to the compressor wheel must be as small as practicable.

At intermediate and high flow rates, the inlet-adjustment mechanism 30 can be placed in the high-trim position as in FIG. 2. This can have the effect of increasing the effective inlet diameter and thus of reducing the flow velocity into the compressor wheel. FIG. 3 illustrates an exemplary compressor map for the high-trim position of FIG. 2. The map is in the form of compressor pressure ratio (discharge pressure divided by inlet pressure) versus corrected flow rate (e.g., mass flow rate corrected to standard temperature and pressure inlet conditions). The map includes a series of constant-speed lines $N1_{P2}$, $N2_{P2}$, $N3_{P2}$, $N4_{P2}$, and $N5_{P2}$ at each of which the compressor rotational speed is held constant while corrected flow and pressure ratio vary. The map includes a high-trim surge line, which is the locus of points at which surge of the compressor is imminent; i.e., if the flow were reduced at the same pressure ratio, or the pressure ratio were increased at the same flow, the compressor would experience surge.

At low flow rates, the inlet-adjustment mechanism 30 can be placed in the low-trim position of FIG. 1. This can have the effect of reducing the effective inlet diameter and thus of increasing the flow velocity into the compressor wheel. The result will be a reduction in compressor blade incidence angles, effectively stabilizing the flow (i.e., making blade stall and compressor surge less likely). In other words, the surge line of the compressor will be moved to lower flow rates (to the left on a map of compressor pressure ratio versus flow rate). This is illustrated in FIG. 4, showing the compressor map for the low-trim position. The low-trim map has the same values of speed lines $N1_{P1}$, $N2_{P1}$, $N3_{P1}$, $N4_{P1}$, and $N5_{P1}$. That is, the value of $N1_{P1}$ is equal to the value of $N1_{P2}$, and the same is true for the other speeds.

FIG. 5 is a map that superimposes the speed lines for the low-trim or P1 position of FIG. 1, and the speed lines for the high-trim or P2 position of FIG. 2. It will be seen that for a given compressor speed, the respective low- and high-trim speed lines cross each other at a point denoted by a solid black circles in FIG. 5. This means that at the pressure ratio and corrected flow condition where the speed lines cross, the inlet-adjustment mechanism can be switched from one of its two positions to the other without there being any significant effect on the flow rate and pressure ratio of the compressor. Thus, for example, at the point labeled "A" in FIG. 5, the inlet-adjustment mechanism can be moved from the P1 position to the P2 position, or from the P2 position to the P1 position, with no significant effect on compressor behavior.

This characteristic speed-line crossing feature can be taken advantage of in designing the control scheme for controlling the operation of the inlet-adjustment mechanism. By establishing a "threshold" line on the superimposed maps in FIG. 5, representing a "best fit" of the speed-line crossing points, the operation of the inlet-adjustment mechanism can be regulated with reference to where on the compressor map the compressor is operating, and in particular where the operating point is located with respect to the threshold line. When the compressor is operating in a region located to the left of the threshold line in FIG. 5 (referred to as the R1 region), the inlet-adjustment mechanism can be placed in the low-trim or P1 position (FIG. 1). When the compressor is operating to the right of the threshold line, in the region denoted as R2, the inlet-adjustment mechanism can be placed in the high-trim or P2 position (FIG. 2). By switching between the P1 and P2 positions when the operating point moves so as to cross the threshold line, the transition from one position to the other will not cause any sudden change in compressor flow rate and pressure ratio.

Implementation of the above-described control scheme can be accomplished in various ways. FIG. 6 illustrates the general architecture of a system for controlling the inlet-adjustment mechanism 30. An actuator 26 of suitable type is coupled to the inlet-adjustment mechanism. The actuator can operate on any of various principles; for example, the actuator can employ an electric motor, a pneumatic device, a hydraulic device, or the like, for imparting movement to the inlet-adjustment mechanism to move it between its P1 and P2 positions. The actuator 26 is in communication with a control unit 40. The control unit includes a processor 50 (such as a microprocessor), a memory 60 (such as non-volatile ROM, PROM, EPROM, or EEPROM memory), and interfaces 70 for communicating with other devices in the system. The memory can be programmed (e.g., in hardware and/or firmware and/or software) with control instructions that are executed by the processor for carrying out the functions of the control unit. In the illustrated embodiment the control unit is an engine control unit or ECU such as present on vehicles such as automobiles and trucks.

FIG. 7 illustrates in further detail an embodiment of the invention for controlling the actuator 26, which in turn controls the inlet-adjustment mechanism. The memory 60 of the control unit stores a base compressor map CM such as the high-trim map of FIG. 3. The map can be stored in any of various forms such as a look-up table that includes the variables of corrected flow $W_c$ versus pressure ratio PR along a series of constant-speed lines N1, N2, N3, etc. The memory also stores the threshold line TL representing the curve-fit of speed-line crossing points derived in the manner previously described. The threshold line can be stored in any of various forms, such as a table of PR versus $W_c$ or a polynomial formula expressing PR as a function of $W_c$. The processor 50 receives inputs of PR and $W_c$ and optionally compressor speed RPM. The pressure ratio and corrected flow are continually sensed by suitable sensors and the sensed values are sent to the processor (e.g., at regular time-step intervals such as every 0.1 second or other suitably selected interval). The processor compares the sensed PR and $W_c$ to the threshold line to determine where the current compressor operating point (OP) is located relative to the threshold line TL. Based on that determination, the processor outputs a SETPOINT to the actuator 26. For example, if the processor determines based on the sensed PR and $W_c$ that the current operating point is in region R1 (e.g., OP1 in FIG. 7), the SETPOINT causes the actuator to place the inlet-adjustment mechanism in the P1 or low-trim position. If the processor determines that the operating point is in the region R2 (e.g., OP2 in FIG. 7), the SETPOINT causes the actuator to place the mechanism in the P2 or high-trim position.

FIG. 8 is a flow diagram illustrating a method in accordance with one embodiment of the invention. A threshold line is identified on the compressor map in a step 100, in the manner generally as described above. In a step 102, PR and $W_c$ for the compressor are detected for the current operating point of the compressor, using suitable sensors as well-known in the art. In a step 104, the current operating point is located on the compressor map, based on the sensed PR and $W_c$. In a step 106 the location of the operating point is compared to the threshold line. For example, at the detected value of PR, the corresponding value of $W_c$ is determined from the table look-up data or the formula representing the threshold line. The actual detected value of $W_c$ is compared to the threshold value. In a step 108, it is determined whether the actual $W_c$ is less than the threshold $W_c$ value; in other words, it is determined whether the operating point is located in the region R1 (see FIG. 5). If the operating point is in region R1, then in a step 110 the inlet-adjustment mechanism is set to the low-trim or P1 position (FIG. 1). If the operating point is not in the region R1, then in a step 112 the inlet-adjustment mechanism is set to the high-trim or P2 position. The process then returns to step 102 and the steps 102 through 108 are repeated at regular time steps. At each time step, the locations of the operating point relative to the threshold line for the previous time step as well as for the current time step are remembered and compared. By suitably selecting the time step interval to be short enough relative to the anticipated maximum rate at which the flow rate through the compressor can change, it can be ensured that the inlet-adjustment mechanism is switched from one position to the other at or sufficiently near the threshold line such that the switch has no significant effect on the flow rate and pressure ratio. Thus, there is no sudden perceptible change in compressor performance.

In accordance with the invention, the first and second compressor maps of FIGS. 3 and 4 can be based on test data for the compressor operated with the inlet-adjustment mechanism respectively in the P1 position and in the P2 position. Alternatively, the first and second compressor maps can be based on model-predicted data for the compressor with the inlet-adjustment mechanism respectively in the P1 position and in the P2 position.

In the illustrated embodiments of the invention, the threshold line is a curve-fit of five points representing the speed-line crossing points at five different compressor speed values. Alternatively, however, the curve fit could be simplified by using as few as two different speeds (thus, a linear threshold line) or using three or four speeds. Of course, more than five speeds can be used as well. The invention is not limited to any particular technique for defining the threshold line.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for controlling a compressor inlet-adjustment mechanism disposed in an air inlet of a centrifugal compressor, the inlet-adjustment mechanism being switchable between two binary positions P1 and P2 for altering a flow area of the inlet, the method comprising:
    identifying a threshold line on a compressor map of pressure ratio PR versus corrected flow rate $W_c$ for the compressor, the threshold line being a line on which the pressure ratio and the corrected flow rate of the compressor are the same for the two binary positions of the inlet-adjustment mechanism at equal rotational speeds;
    continually detecting PR and $W_c$ of the compressor during operation as an operating point of the compressor moves around on the compressor map; and
    placing the inlet-adjustment mechanism in one of the binary positions or the other based on a comparison of a location of the operating point relative to the threshold line on the compressor map.

2. The method of claim 1, further comprising:
    providing a first compressor map describing performance of the compressor with the inlet-adjustment mechanism in the P1 position, the first compressor map being in the form of compressor pressure ratio PR versus corrected flow rate $W_c$, the first compressor map including at least two constant-speed lines $N1_{P1}$ and $N2_{P2}$ each representing PR versus $W_c$ with rotational speed of the compressor held constant;
    providing a second compressor map describing performance of the compressor with the inlet-adjustment mechanism in the P2 position, the second compressor map being in the form of compressor pressure ratio PR versus corrected flow rate $W_c$, the second compressor map including at least two constant-speed lines $N1_{P2}$ and $N2_{P2}$ each representing PR versus $W_c$ with rotational speed of the compressor held constant, where the value of $N1_{P1}$ is equal to the value of $N1_{P2}$ and the value of $N2_{P1}$ is equal to the value of $N2_{P2}$;
    wherein the identifying step further comprises identifying a threshold line comprising a curve fit of at least two points each represented by coordinates of PR versus $W_c$ at which the $N1_{P1}$ speed line crosses the $N1_{P2}$ speed line and the $N2_{P1}$ speed line crosses the $N2_{P2}$ speed line, such that for operating points falling on the threshold line, pressure ratio and corrected flow at equal speeds are the same with the inlet-adjustment mechanism in the P1 and P2 positions, wherein the threshold line divides the first compressor map into two regions R1 and R2 respectively located on opposite sides of the threshold line;
    comparing, for a current operating point of the compressor during operation, pressure ratio PR and corrected flow $W_c$ to the threshold line and determining which of the two regions R1 and R2 the current operating point falls into; and
    wherein the placing step further comprises placing the inlet-adjustment mechanism in the P1 position when the operating point falls into the region R1 and placing the inlet-adjustment mechanism in the P2 position when the operating point falls into the region R2.

3. The method of claim 2, wherein the first compressor map includes at least a third speed line $N3_{P1}$ and the second compressor map includes at least a third speed line $N3_{P2}$ providing at least a third point represented by coordinates of PR versus $W_c$ at which the $N3_{P1}$ speed line crosses the $N3_{P2}$ speed line, the threshold line being a curve fit of at least three points.

4. The method of claim 2, further comprising storing the first compressor map in an engine control unit (ECU), and inputting the detected PR and $W_c$ into the ECU, wherein the ECU is programmed to perform the comparing step periodically as the current operating point moves around on the first compressor map, and further comprising outputting a command from the ECU to an actuator for the inlet-adjustment mechanism for placing the inlet-adjustment mechanism in one of the P1 and P2 positions or the other of the P1 and P2 positions based upon results of the comparing step.

5. The method of claim 2, wherein the first and second compressor maps are based on test data for the compressor operated with the inlet-adjustment mechanism respectively in the P1 position and in the P2 position.

6. The method of claim 1, wherein the first and second compressor maps are based on model-predicted data for the compressor with the inlet-adjustment mechanism respectively in the P1 position and in the P2 position.

* * * * *